United States Patent [19]

Koerte

[11] Patent Number: 4,609,727

[45] Date of Patent: Sep. 2, 1986

[54] 5-$C_{1-4}$ALKOXY-2-$C_{1-2}$ALKYL-2',4'-DINITRO-6'-HALO-4-SUBSTITUTED AMINO-AZOBENZENES

[75] Inventor: Klaus Koerte, Ettingen, Switzerland

[73] Assignee: Sandoz Ltd., Basel, Switzerland

[21] Appl. No.: 450,289

[22] Filed: Dec. 16, 1982

[30] Foreign Application Priority Data

Dec. 21, 1981 [CH] Switzerland ................... 8159/81
Dec. 21, 1981 [CH] Switzerland ................... 8160/81

[51] Int. Cl.[4] .................. C09B 29/01; C09B 29/34; C09B 29/08; D06P 1/18
[52] U.S. Cl. ........................... 534/858; 534/732; 534/852; 534/840; 534/856; 534/857; 534/859
[58] Field of Search .................. 260/206, 207, 207.1, 260/207.5; 534/732, 843, 858, 856, 857, 859

[56] References Cited

U.S. PATENT DOCUMENTS

| | | | |
|---|---|---|---|
| 1,978,763 | 10/1934 | Reddelien et al. | 260/97 |
| 2,109,182 | 2/1938 | Ohlendorf et al. | 260/96 |
| 2,173,417 | 9/1939 | Huber | 260/198 |
| 2,221,911 | 11/1940 | Dickey | 260/206 |
| 2,312,398 | 3/1943 | Felix | 8/26 |
| 2,491,481 | 12/1949 | Dickey | 260/205 |
| 3,337,522 | 8/1967 | Wegmuller | 260/158 |
| 3,503,954 | 3/1970 | Gies | 260/205 |
| 3,522,234 | 7/1970 | Groebke | 260/207.1 |
| 3,562,789 | 2/1971 | Sasa et al. | 260/207 |
| 3,740,189 | 6/1973 | Doss et al. | 260/207.1 |
| 3,955,919 | 5/1976 | Fujii et al. | 260/207 |
| 3,980,636 | 9/1976 | Weaver et al. | 260/207 |
| 4,099,909 | 7/1978 | Koller et al. | 260/205 |
| 4,105,665 | 8/1978 | Gottschlich | 260/207.1 |
| 4,111,930 | 9/1978 | Meybeck | 260/207.5 |
| 4,278,599 | 7/1981 | Clark | 260/207.1 |
| 4,307,015 | 12/1981 | Koerte | 260/196 |
| 4,313,872 | 2/1982 | Heinrich et al. | 260/207.1 |
| 4,447,359 | 5/1984 | Aeschlimann | 260/207 |

FOREIGN PATENT DOCUMENTS

| | | | |
|---|---|---|---|
| 744073 | 11/1943 | Fed. Rep. of Germany | 260/205 |
| 745502 | 12/1943 | Fed. Rep. of Germany . | |
| 2318294 | 10/1973 | Fed. Rep. of Germany . | |
| 3112427 | 10/1982 | Fed. Rep. of Germany . | |
| 812936 | 5/1937 | France . | |
| 42-3009 | 2/1967 | Japan . | |
| 49-71020 | 7/1974 | Japan . | |
| 50-13680 | 2/1975 | Japan . | |
| 553239 | 7/1974 | Switzerland . | |
| 419945 | 11/1934 | United Kingdom . | |
| 819664 | 9/1959 | United Kingdom | 260/207 |
| 824443 | 12/1959 | United Kingdom | 260/207 |
| 845220 | 8/1960 | United Kingdom | 260/207 |
| 1268040 | 3/1972 | United Kingdom . | |
| 2003495 | 3/1979 | United Kingdom . | |
| 2010887 | 7/1979 | United Kingdom . | |
| 2024836 | 1/1980 | United Kingdom . | |

Primary Examiner—Floyd D. Higel
Attorney, Agent, or Firm—Gerald D. Sharkin; Richard E. Vila; Melvyn M. Kassenoff

[57] ABSTRACT

Compounds of the formula

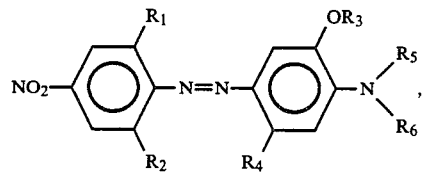

wherein $R_1$ is nitro or cyano;
$R_2$ is cyano or halo;
$R_3$ is $C_{1-4}$alkyl;
$R_4$ is methyl or ethyl;
$R_5$ is $C_{1-8}$alkyl; and
$R_6$ is —$CH_2CHOHCH_2O(CH_2CH_2O)_aR_7$, —$CH_2$-$CHOHC_6H_5$, —$CH(C_6H_5)CH_2OH$; —$(CH_2)_nO$—CO—$NHR_3$, —$CH_2CH(R_4)$—O—CO—$NHR_3$; —$(CH_2)_n$—O—CO—$R_3$, —$CH_2CH(R_4)$—O—CO—$R_3$ or $C_{2-4}$hydroxyalkyl, with the provisos that $R_6$ may be any of the last three groups only when $R_1$ and $R_2$ are both cyano and that $R_6$ may be $C_{2-4}$hydroxyalkyl also when $R_5$ is $C_{1-2}$alkyl, wherein $R_7$ is phenyl; phenyl substituted by 1 or 2 substituents independently selected from hydroxy, chloro, bromo, methyl and $C_{1-4}$alkoxy; benzyl; benzyl substituted by 1 or 2 substituents independently selected from hydroxy, chloro, bromo, methyl and $C_{1-4}$alkoxy; allyl; haloalkyl; propyn-2-yl or halopropyn-2-yl, with the proviso that $R_7$ may be allyl, haloallyl, propyn-2-yl or halopropyn-2-yl only when a is 0;

a is 0 or 1; and
n is 2 or 3, processes for their preparation and their use for dyeing and printing textiles comprising synthetic or semi-synthetic, hydrophobic, high molecular weight materials, e.g., linear aromatic polyester, cellulose 2½ acetate, cellulose triacetate and synthetic polyamides, by, for example, the rapid dyeing procedure.

17 Claims, No Drawings

5-$C_{1-4}$ALKOXY-2-$C_{1-2}$ALKYL-2',4'-DINITRO-6'-HALO-4-SUBSTITUTED AMINO-AZOBENZENES

The invention relates to disperse dyes and in particular to their use in rapid dyeing.

The invention provides compounds of formula I

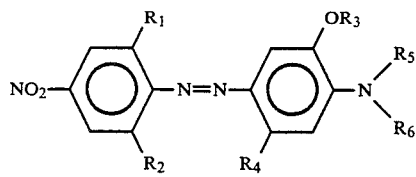

in which
$R_1$ is —$NO_2$ or —CN;
$R_2$ is —CN or halogen;
$R_3$ is $C_{1-4}$alkyl;
$R_4$ is methyl or ethyl;
$R_5$ is $C_{1-8}$alkyl; and
$R_6$ is —$CH_2CHOHCH_2O(CH_2CH_2O)_aR_7$; —$CH_2CHOHC_6H_5$; —$CH(C_6H_5)CH_2OH$, —$(CH_2)_nO$—CO—$NHR_3$ or —$CH_2CH(R_4)$—O—CO—$NHR_3$;

or when both $R_1$ and $R_2$ are —CN, also —$(CH_2)_n$—O—CO—$R_3$, —$CH_2CH(R_4)$—O—CO—$R_3$ or a straight chain or branched $C_{2-4}$-hydroxyalkyl group; or when $R_5$ is methyl or ethyl additionally linear or branched $C_{2-4}$hydroxy alkyl; and $R_7$ is phenyl, unsubstituted or substituted by up to two groups selected from —OH, Cl, Br, methyl and $C_{1-4}$alkoxy; benzyl, unsubstituted or substituted by up to two groups selected from —OH, Cl, Br, methyl or $C_{1-4}$alkoxy; and, when a is zero, $R_7$ is additionally allyl, unsubstituted or substituted by one halogen, or propyn-2-yl, unsubstituted or substituted by one halogen;

a is 0 or 1; and
n is 2 or 3.

Where a symbol appears more than once in a formula its significances are independent of one another.

By the term "halogen" is meant F, Cl, Br and I, more preferably Cl and Br.

In $R_6$ preferred groups of linear and branched $C_{2-4}$-hydroxyalkyl groups are —$CH_2OHR_4$ and —$(CH_2)_bOH$ where b is 1, 2 or 3. Preferred $C_{1-4}$alkoxy groups are methoxy and ethoxy.

Preferably $R_3$ and $R_4$ are methyl.

Preferably $R_5$ is $C_{1-4}$alkyl, more preferably $C_{1-3}$alkyl, most preferably methyl and ethyl.

Preferred compounds of formula I are of formula II, III or IV,

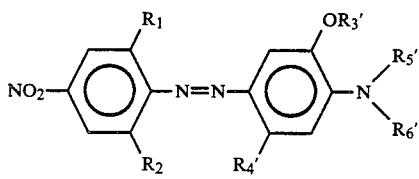

in which
$R_1$ and $R_2$ are defined above;
$R_3'$ and $R_4'$ are methyl;
$R_5'$ is $C_{1-4}$alkyl; and
$R_6'$ is —$CH_2CHOHCH_2O(CH_2CH_2O)_aR_7'$; or when $R_1$ and $R_2$ are —CN, additionally —$CH_2CHOHC_6H_5$, —$CH(C_6H_5)CH_2OH$, —$CH_2CH_2OCOR_3$, —$CH_2CH_2OCONHR_3$ or linear or branched $C_{2-3}$hydroxyalkyl or, when $R_5$ is methyl or ethyl, additionally linear or branched $C_{2-3}$hydroxyalkyl; and $R_7'$ is phenyl, unsubstituted or substituted by up to two groups selected from —OH, Cl, Br, methyl and $C_{1-4}$alkoxy;

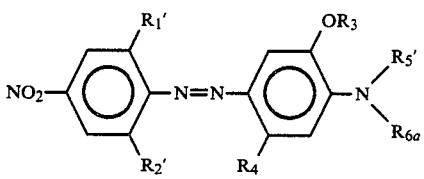

in which
$R_3$, $R_4$, $R_5'$ are defined above; and
$R_1'$ and $R_2'$ are —CN;
$R_{6a}$ is linear or branched $C_{2-3}$hydroxyalkyl, —$CH_2CH_2OCONHR_3$, —$CH_2CH(R_4)O$—$CONHR_3$, —$CH_2CH_2OCOR_3$; —$CH_2CH(R_4)OCOR_3$, —$CH_2CH(C_6H_5)OH$ or —$CH(C_6H_5)CH_2OH$;

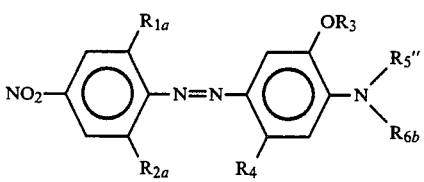

in which
$R_3$ and $R_4$ are defined above;
$R_{1a}$ is $NO_2$;
$R_{2a}$ is —CN, Cl or Br;
$R_5''$ is methyl or ethyl;
$R_{6b}$ is linear or branched $C_{2-3}$hydroxyalkyl or β-hydroxy-γ-phenoxypropyl.

Preferably in compounds of formula II, $R_6'$ is

—$CH_2CHOHCH_2O(CH_2CH_2O)_aR_7'$, where a and $R_7'$ are as defined above.

Preferably in compounds of formula III, $R_3$ and $R_4$ are methyl, $R_5'$ is $C_{1-3}$alkyl and $R_{6a}$ is acetoxyethyl.

Preferably in compounds of formula IV $R_{2a}$ is Cl or Br, $R_3$ and $R_4$ are methyl, $R_5''$ is methyl or ethyl and $R_{6b}$ is β-hydroxy-γ-phenoxypropyl.

Most preferred compounds of formula I are those in which $R_1$ is —$NO_2$, $R_2$ is Cl or Br, $R_3$ and $R_4$ are methyl, $R_5$ is methyl or ethyl (preferably methyl) and $R_6$ is —$CH_2CHOHCH_2OC_6H_5$ or —$CH_2CH_2OH$.

The compounds of formula I may be prepared by reacting a diazotised amine of formula V

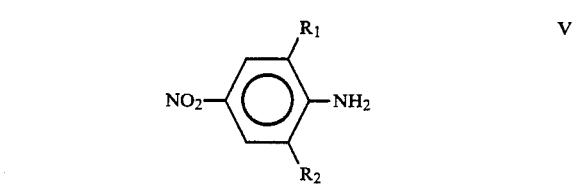

with a compound of formula VI

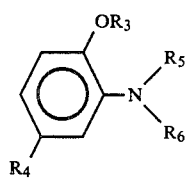

in which $R_1-R_6$ are defined above.

The compounds of formulae V and VI are known or may be made by known methods from known compounds.

Azo compounds of formula I in which $R_1$ and/or $R_2$ are cyano groups may be prepared from compounds of the formula

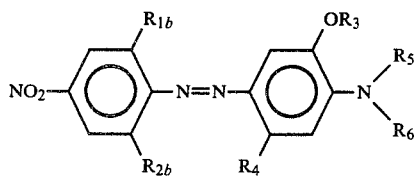

in which
$R_{1b}$ is Cl, Br, I or $-NO_2$;
$R_{2b}$ is Cl, Br or I; and
$R_3-R_6$ are defined above;
by replacing the halogen of $R_{2b}$ and $R_{1b}$ (when present) with a cyano group.

Cyano group exchange may be carried out by a variety of known cyano exchange methods.

Dyeing preparations of the compounds of formula I may be formulated by known methods, for example by grinding in the presence of a dispersing agent or a filling material. The preparation (which may be vacuum dried or atomised dried) can be used for dyeing, padding or printing with the addition of water from a short or long dyebath.

The dyestuffs exhaust very well from aqueous suspensions on textile material of semi- or fully synthetic hydrophobic high molecular weight material. The dyestuffs exhaust particularly well on textile material formed from linear aromatic polyester or cellulose 2½ acetate, cellulose triacetate or synthetic polyamides.

Dyeing and printing can be carried out according to the method of British Pat. No. 1,114,433.

The compounds of formula I are useful in the so called "rapid dyeing" procedure, in particular for the rapid dyeing of polyester material. In this method the substrate is immersed in a dyebath in a dyeing apparatus and heated to 130° C. over a time period of 20–30 minutes and then is maintained only for a further 20 minutes at this temperature.

The resulting dyeings show overall good fastnesses, in particular good light fastness, thermofixation fastness, sublimation fastness and pleating fastness.

The invention will now be illustrated by the following examples in which all parts and percentages are by weight and all temperatures are in °C.

EXAMPLE 1

122 Parts of concentrated sulphuric acid and 35 parts of a 40% nitrosylsulphuric acid are mixed ensuring that the temperature of the mixture does not exceed 20° C.

26.2 Parts of 2-bromo-4,6-dinitroaniline are added to the above mixture and are stirred for 4 hours maintaining the temperature of the mixture between 15° and 20°.

The solution is slowly added, whilst stirring and cooling at a temperature of −5° to 0°, to a solution of 30.1 parts of N-methyl-N-(β-hydroxy-γ-phenoxypropyl)-2-methoxy-5-methylaniline, 50 parts of sodium acetate in 500 parts of glacial acetic acid and 750 parts of a mixture of water and ice. The temperature of the coupling reaction is maintained at 0° to 5° by the further addition of ice.

After coupling is completed the resulting dyestuff is filtered, washed with slightly acidic and salt-free water and is stirred overnight into a fresh amount of 3000 parts of water.

The mixture is then heated to 90° and maintained at this temperature for 4 hours.

After filtration, washing, drying and recrystallisation, the dyestuff of the formula

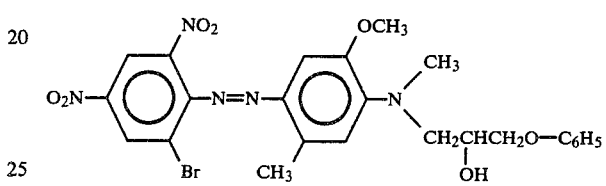

results. This dyestuff dyes polyester material a navy blue colour and gives good fastness properties. The dyestuff is also very good in "rapid dyeing" processes.

EXAMPLE 2

To a mixture of 200 parts glacial acetic acid, 40 parts of sulphuric acid and 35 parts of nitrosylsulphuric acid formed below 10°, 24.2 parts of 2-bromo-4-nitro-6-cyanoaniline are added according to the method of Example 1 and then the solution is added to a mixture of 26.5 parts of N-propyl-N-(β-acetoxyethyl)-p-cresidine, 50 parts of sodium acetate dissolved in 500 parts of glacial acetic acid and 750 parts of a mixture of water and ice, whereby coupling occurs whilst the reaction is maintained at 0°–5° C.

After completion of the coupling the resulting dyestuff is filtered, washed with acid free water and stirred overnight in a fresh amount of 3000 parts of water. The dyestuff is filtered, dried and recrystallised from ethyl acetate, dissolved in 400 parts of dimethylformamide, reacted with 9 parts of CuCN and stirred at 70° for 24 hours, whereby the reddish blue solution is converted to a greenish blue solution and the dyestuff precipitates in crystalline form. After cooling the reaction mass, the dyestuff is filtered, washed with water and stirred in a fresh amount of 300 parts water, 10 parts of HCl (conc.) and 20 parts of ferric chloride at room temperature for 1 hour. The dyestuff is filtered, washed with water, dried and recrystallized from ethyl acetate. The dyestuff of the formula

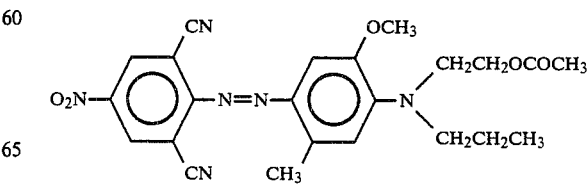

that results dyes polyester a blue tone.

EXAMPLES 3 TO 103

Compounds of the formula

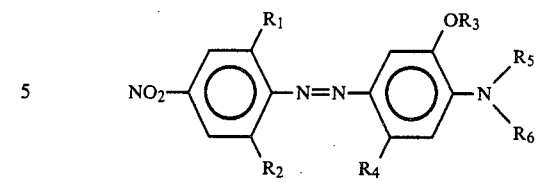

are produced according to the method of Example 1 or 2, in which $R_1$ to $R_6$ are given in the Table below

TABLE

| EX. NO. | $R_5$ | $R_6$ | $R_3$ | $R_4$ | $R_1$ | $R_2$ |
|---|---|---|---|---|---|---|
| 3 | —$CH_3$ | —$CH_2CH_2OH$ | —$CH_3$ | —$CH_3$ | —$NO_2$ | Cl |
| 4 | " | " | " | " | " | I |
| 5 | " | " | " | " | " | Br |
| 6 | " | " | " | " | " | F |
| 7 | —$C_2H_5$ | " | —$CH_3$ | " | " | Br |
| 8 | " | " | " | " | " | Cl |
| 9 | " | " | —$C_2H_5$ | " | " | Cl |
| 10 | —$CH_3$ | —$CH_2CHOHCH_3$ | —$CH_3$ | " | " | Br |
| 11 | —$C_2H_5$ | " | " | " | " | Cl |
| 12 | " | —$CH_2CHOHC_2H_5$ | " | " | " | Br |
| 13 | —$CH_3$ | —$CH_2CHOHCH_2OC_6H_5$ | " | " | " | Cl |
| 14 | " | —$CH_2CHOHCH_2OC_6H_4$—4-Cl | " | " | " | Br |
| 15 | " | —$CH_2CHOHCH_2OC_6H_4$—3-OH | " | " | " | Br |
| 16 | " | —$CH_2CHOHCH_2OC_6H_4$—4-$OCH_3$ | —$C_2H_5$ | " | " | Br |
| 17 | " | —$CH_2CHOHCH_2OC_6H_4$—2-OH | —$CH_3$ | " | " | " |
| 18 | —$C_2H_5$ | —$CH_2CHOHCH_2OC_6H_5$ | " | " | " | " |
| 19 | " | " | " | " | " | Cl |
| 20 | " | —$CH_2CHOHCH_2OC_6H_4$—4-OH | " | " | " | Br |
| 21 | " | —$CH_2CHOHCH_2OC_6H_3$—3-OH—4-Cl | " | " | " | Cl |
| 22 | —$C_3H_7$ | —$CH_2CHOHCH_2OC_6H_5$ | —$CH_3$ | —$CH_3$ | —$NO_2$ | Br |
| 23 | " | —$CH_2CHOHCH_2OC_6H_4$—3-OH | " | " | " | Cl |
| 24 | —$C_4H_9$ | —$CH_2CHOHCH_2C_6H_5$ | " | " | " | Br |
| 25 | —$CH_3$ | —$CH_2CHOHCH_2OCH_2CH=CH_2$ | " | " | " | Br |
| 26 | —$C_2H_5$ | " | " | " | " | Br |
| 27 | —$CH_3$ | —$CH_2CHOHCH_2OCH_2C\equiv CH$ | " | " | " | Br |
| 28 | —$C_2H_5$ | " | " | " | " | Br |
| 29 | —$C_3H_7$ | " | " | " | " | Br |
| 30 | —$CH_3$ | —$CH_2CHOHCH_2OCH_2CH_2OC_6H_5$ | " | " | " | Br |
| 31 | " | " | " | " | " | Cl |
| 32 | " | —$CH_2CHOHCH_2OCH_2CH_2OC_6H_4$—4-Cl | " | " | " | Br |
| 33 | —$C_2H_5$ | —$CH_2CHOHCH_2OCH_2CH_2OC_6H_5$ | " | —$C_2H_5$ | " | Br |
| 34 | —$C_3H_7$ | " | " | —$CH_3$ | " | Cl |
| 35 | " | —$CH_2CHOHCH_2OCH_2CH_2OC_6H_4$—4-$OCH_3$ | " | " | " | Br |
| 36 | " | —$CH_2CHOHCH_2OCH_2CH_2OC_6H_5$ | " | " | —$NO_2$ | I |
| 37 | —$CH_3$ | —$CH_2CHOHC_6H_5$ | " | " | " | Br |
| 38 | " | —$CH(C_6H_5)CH_2OH$ | " | " | " | Br |
| 39 | " | —$CH_2CHOHC_6H_5$ | " | " | " | Cl |
| 40 | " | —$CH(C_6H_5)CH_2OH$ | " | " | " | Cl |
| 41 | —$C_2H_5$ | " | " | " | " | Br |
| 42 | " | —$CH_2CHOHC_6H_5$ | " | " | " | Br |
| 43 | —$C_3H_7$ | " | " | " | " | Br |
| 44 | " | —$CH(C_6H_5)CH_2OH$ | " | " | " | Br |
| 45 | —$CH_3$ | —$CH_2CH_2OH$ | " | " | " | —CN |
| 46 | —$(CH_2)_3CH_3$ | " | " | " | —CN | " |
| 47 | —$CH_3$ | —$CH_2CH_2$—O—CO—NH—$C_2H_5$ | " | " | —$NO_2$ | " |
| 48 | " | —$CH_2CH_2CH_2OH$ | " | " | —CN | " |
| 49 | —$C_2H_5$ | —$CH_2CH_2OH$ | " | " | —$NO_2$ | " |
| 50 | —$C_3H_7$ | —$CH_2CH_2O$—CO—$NHC_2H_5$ | " | " | —CN | " |
| 51 | " | —$CH_2CH_2OH$ | " | " | " | " |
| 52 | " | " | —$C_3H_7$ | " | " | " |
| 53 | —$CH_3$ | —$CH_2CHOHCH_3$ | —$CH_3$ | " | —$NO_2$ | " |
| 54 | " | " | " | " | —CN | " |
| 55 | " | —$CH_2CHOHC_2H_5$ | " | " | —$NO_2$ | " |
| 56 | —$C_3H_7$ | " | " | " | —CN | " |
| 57 | —$CH_3$ | —$CH_2CHOHCH_2OC_6H_5$ | " | " | " | " |
| 58 | " | " | " | " | —$NO_2$ | " |
| 59 | " | —$CH_2CHOHCH_2OC_6H_4$—4-Cl | " | " | —CN | " |
| 60 | " | —$CH_2CHOHCH_2OC_6H_3$—2,5-di-Cl | " | " | " | " |
| 61 | " | —$CH_2CHOHCH_2OC_6H_3$—2,4-di-Cl | " | " | " | " |
| 62 | " | —$CH_2CHOHCH_2OC_6H_4$—3-OH | " | " | " | " |
| 63 | " | —$CH_2CHOHCH_2OC_6H_4$—2-OH | " | " | " | " |
| 64 | " | —$CH_2CHOHCH_2OC_6H_4$—4-$CH_3$ | " | " | " | " |
| 65 | " | —$CH_2CHOHCH_2OC_6H_4$—3-$CH_3$ | " | " | " | " |
| 66 | " | —$CH_2CHOHCH_2OC_6H_3$—2-$CH_3$—4-Cl | " | " | " | " |
| 67 | " | —$CH_2CHOHCH_2OC_6H_4$—4-$OCH_3$ | " | " | " | " |
| 68 | " | —$CH_2CHOHCH_2OC_6H_3$—3-OH—4Cl | " | " | " | " |

TABLE-continued

| EX. NO. | $R_5$ | $R_6$ | $R_3$ | $R_4$ | $R_1$ | $R_2$ |
|---|---|---|---|---|---|---|
| 69 | " | $-CH_2CHOHCH_2OC_6H_4-3-OCH_3$ | " | " | " | " |
| 70 | " | $-CH_2CHOHCH_2OC_6H_5$ | " | " | " | " |
| 71 | $-C_2H_5$ | " | $-C_2H_5$ | " | " | " |
|    |          |   | $-CH_3$ | " | $-NO_2$ | " |
| 72 | " | " | " | " | $-CN$ | " |
| 73 | $-C_3H_7$ | " | " | " | " | " |
| 74 | $-CH_3$ | " | " | $-C_2H_5$ | " | " |
| 75 | " | $-CH_2CHOHCH_2OCH_2CH=CH_2$ | " | $-CH_3$ | $-NO_2$ | " |
| 76 | " | " | " | " | $-CN$ | " |
| 77 | $-C_2H_5$ | " | " | " | $-NO_2$ | " |
| 78 | " | " | " | " | $-CN$ | " |
| 79 | $-C_3H_7$ | " | " | " | $-NO_2$ | " |
| 80 | " | " | " | $-C_2H_5$ | $-CN$ | " |
| 81 | $-C_4H_9$ | " | " | $-CH_3$ | " | " |
| 82 | $-CH_3$ | $-CH_2CHOHCH_2OCH_2C\equiv CH$ | " | " | $-NO_2$ | " |
| 83 | $-C_3H_7$ | " | " | " | $-CN$ | " |
| 84 | $-CH_3$ | $-CH_2CHOHCH_2OCH_2CH_2OC_6H_5$ | " | " | $-NO_2$ | " |
| 85 | " | $-CH_2CHOHCH_2OCH_2CH_2OC_6H_4-4-OH$ | " | " | $-CN$ | " |
| 86 | $-C_2H_5$ | $-CH_2CHOHCH_2OCH_2CH_2OC_6H_5$ | $-C_2H_5$ | $-CH_3$ | $-NO_2$ | $-CN$ |
| 87 | $-C_3H_7$ | " | $-CH_3$ | " | $-CN$ | " |
| 88 | $-CH_3$ | $-CH_2CHOHC_6H_5$ | " | " | $-NO_2$ | " |
| 89 | " | $-CH(C_6H_5)CH_2OH$ | " | " | " | " |
| 90 | " | " | " | " | $-CN$ | " |
| 91 | " | $-CH_2CHOHC_6H_5$ | " | " | " | " |
| 92 | $-C_3H_7$ | " | " | " | " | " |
| 93 | " | $-CH(C_6H_5)CH_2OH$ | " | " | " | " |
| 94 | " | " | " | " | $-NO_2$ | " |
| 95 | " | $-CH_2CHOHC_6H_5$ | " | " | " | " |
| 96 | $-C_4H_9$ | " | " | $-C_2H_5$ | $-CN$ | " |
| 97 | " | $-CH(C_6H_5)CH_2OH$ | " | " | " | " |
| 98 | $-C_3H_7$ | $-CH_2CH(CH_3)-OCOCH_3$ | " | $-CH_3$ | " | " |
| 99 | " | $-CH_2CH(CH_3)-OCOC_2H_5$ | " | " | " | " |
| 100 | " | $-(CH_2)_3-OCOCH_3$ | " | " | " | " |
| 101 | $-CH_3$ | $-CH_2CH_2CH_2OH$ | " | " | $-NO_2$ | Cl |
| 102 | " | " | " | " | " | Br |
| 103 | " | $-CH_2CHOHCH_2OCH_2CH=CHCl$ | " | " | " | Cl |

The dyestuffs of Example 3 to 103 dye polyester material a blue tone. (Examples 3 to 44 produce a navy blue tone) and have good fastnesses.

DYEING EXAMPLE

(a) Production of a Dyeing Preparation 10 g of the dyestuff of Example 1, 9.3 g of sodium lignin sulphonate and 25 ml of demineralised water are stirred in a 150 ml beaker with a two plate stirrer at 150–200 revs. per minute. If a homogenous paste results the rate of stirring is increased to a maximum of 1500–2000 revs. per minute whilst 156 g (=85 ml) of siliquarzite pearls (31-5/31-7 1:1) are added until a viscous grindable surface layer results. The material is slowly ground whilst cooling in a continuous flowing water bath until a fluid sample no longer produces a ring on a filter paper. The stirring is then reduced 500 revs. per minute and the mass is reacted with a solution of 9.3 g of sodium lignin sulphonate and 20 ml of demineralized water as a result of which the mass becomes slightly fluid. The mass is mixed well for 10 minutes, filtered through a glass filter flask G2 and rinsed with 300 ml of demineralised water.

The dispersion has a pH of 9.0–9.5 and is brought to pH of 6.5 by the addition of a 10% phosphoric acid solution.

Finally the dispersion is dried and then finely pulverized in a mill.

Instead of the dyestuff of Example 1 any one of the dyestuffs of Examples 2 to 103 may be used in an appropriate amount.

(b) Rapid Dyeing

5 Parts of a precleaned polyester web are immersed in a high temperature dyeing bath in 100 parts of a dyebath heated to 70°, the 100 parts of dyebath comprising 0.1 parts of the above-mentioned dyeing preparation of the dyestuff of Example 1 and 2 parts ammonium sulphate, the balance being water and the bath is brought to pH 5 by the addition of formic acid. The dyeing apparatus is then closed and is heated over 20 minutes to 130° and then maintained at this temperature for a further 20 minutes. After cooling the polyester web is removed from the dyebath, rinsed, soaped, rinsed again and dried. A level deep blue dyeing results with good fastness properties. The remaining dyebath is practically colourless. Indeed when a sample is removed as soon as the dyebath reached 130° C. it has been found that the remaining dyebath contains about 10% of the dyestuff.

Instead of the dyeing preparations of the dyestuff of Example 1 the dyeing preparations of a dyestuff of any one of Examples 2 to 103 may be used.

What is claimed is:

1. A compound of the formula

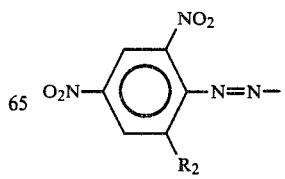

-continued

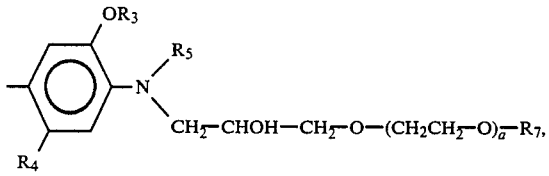

wherein
R$_2$ is halo,
R$_3$ is C$_{1-4}$alkyl,
R$_4$ is methyl or ethyl,
R$_5$ is C$_{1-8}$alkyl,
R$_7$ is phenyl; phenyl substituted by 1 or 2 substituents independently selected from hydroxy, chloro, bromo, methyl and C$_{1-4}$alkoxy; benzyl; benzyl substituted by 1 or 2 substituents independently selected from hydroxy, chloro, bromo, methyl and C$_{1-4}$alkoxy; allyl; allyl monosubstituted by halo; or propyn-2-yl monosubstituted by halo, with the proviso that R$_7$ may be allyl, allyl monosubstituted by halo or propyn-2-yl monosubstituted by halo only when a is 0, and
a is 0 or 1,
wherein each halo is independently fluoro, chloro, bromo or iodo.

2. A compound according to claim 1 having the formula

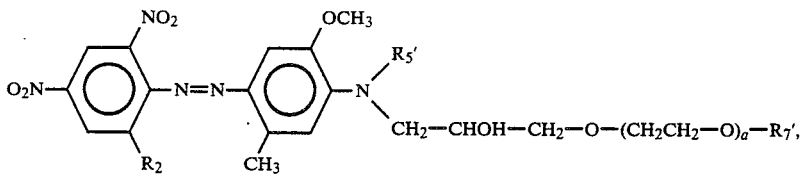

wherein
R$_2$ is halo,
R$_5'$ is C$_{1-4}$alkyl,
R$_7'$ is phenyl or phenyl substituted by 1 or 2 substituents independently selected from hydroxy, chloro, bromo, methyl and C$_{1-4}$alkoxy, and
a is 0 or 1.

3. A compound according to claim 1 having the formula

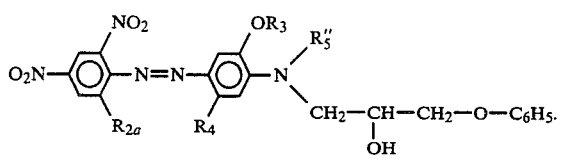

wherein
R$_{2a}$ is chloro or bromo,
R$_3$ is C$_{1-4}$alkyl,
R$_4$ is methyl or ethyl, and
R$_5''$ is methyl or ethyl.

4. A compound according to claim 3 wherein
R$_3$ is methyl, and
R$_4$ is methyl.

5. The compound according to claim 4 having the formula

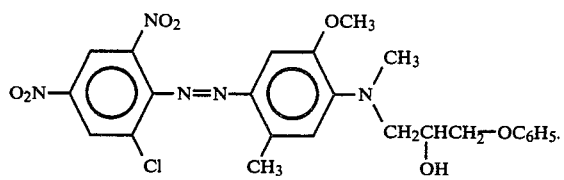

6. The compound according to claim 4 having the formula

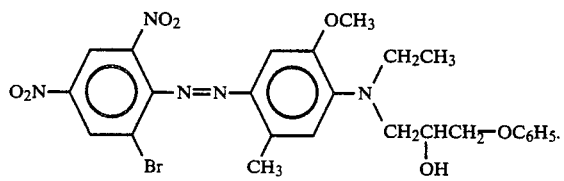

7. The compound according to claim 4 having the formula

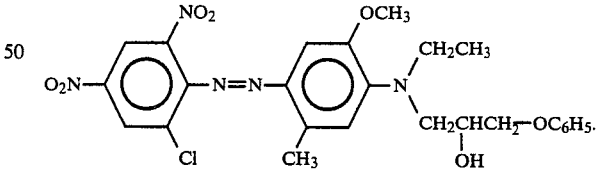

8. The compound according to claim 4 having the formula

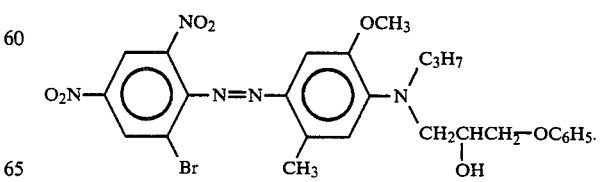

9. The compound according to claim 2 having the formula

10. The compound according to claim 2 having the formula

12. The compound according to claim 2 having the formula

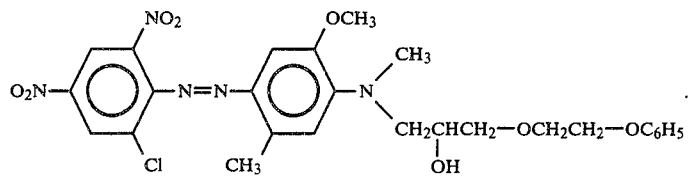

13. The compound according to claim 2 having the formula

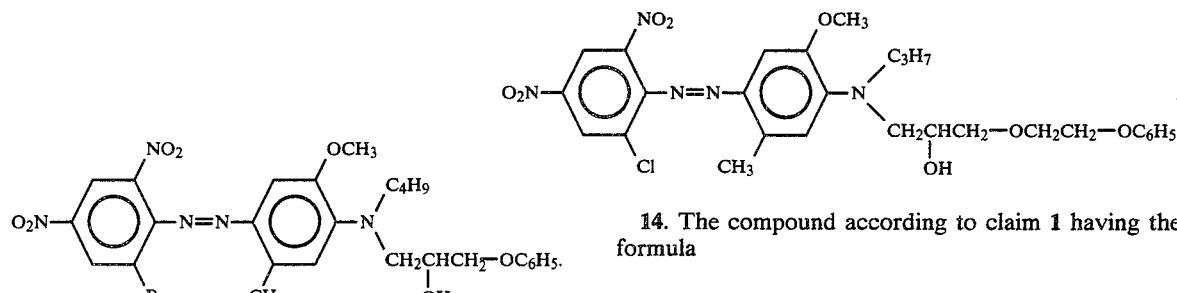

14. The compound according to claim 1 having the formula

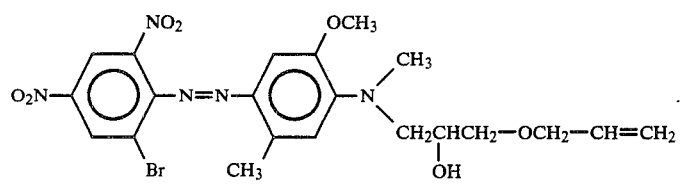

15. The compound according to claim 1 having the formula

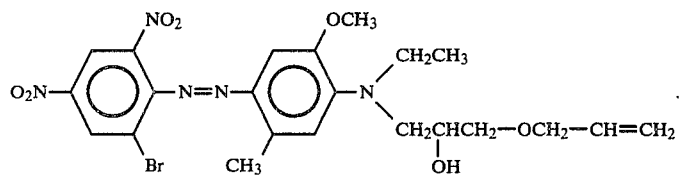

16. The compound according to claim 1 having the formula

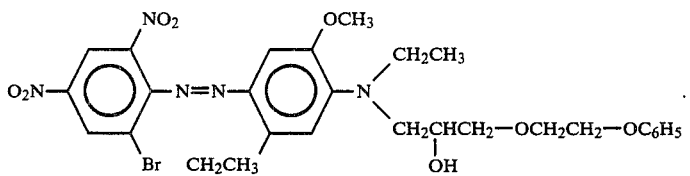

11. The compound according to claim 2 having the formula

17. The compound according to claim 1 having the formula

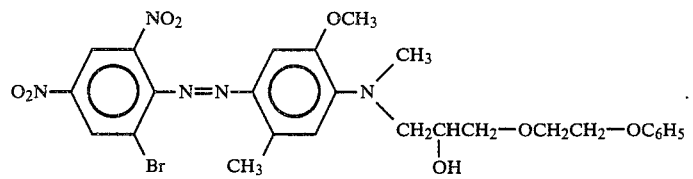

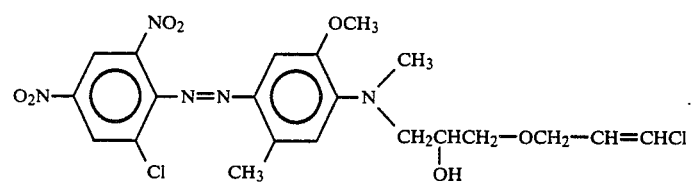
* * * * *